May 11, 1926.
W. S. COTHRAN
DISK BEARING
Filed Dec. 11, 1923
1,584,616
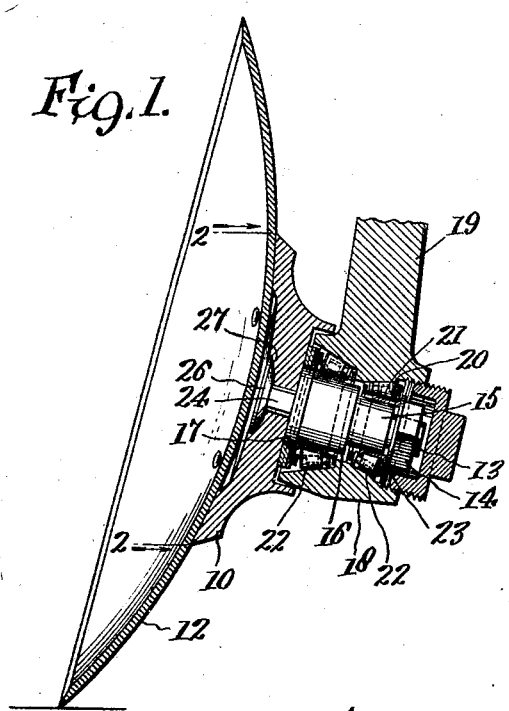
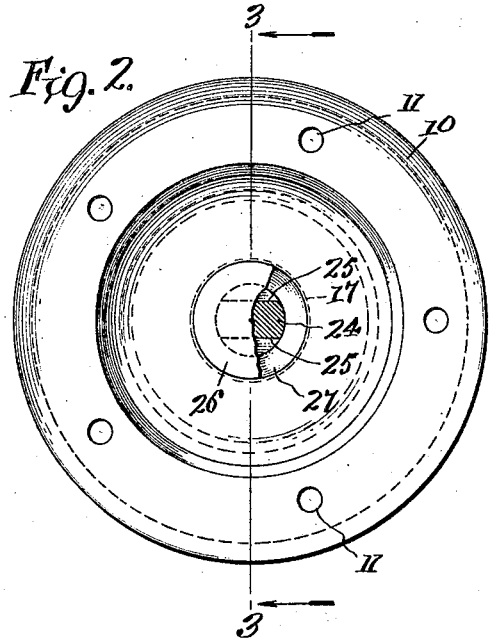
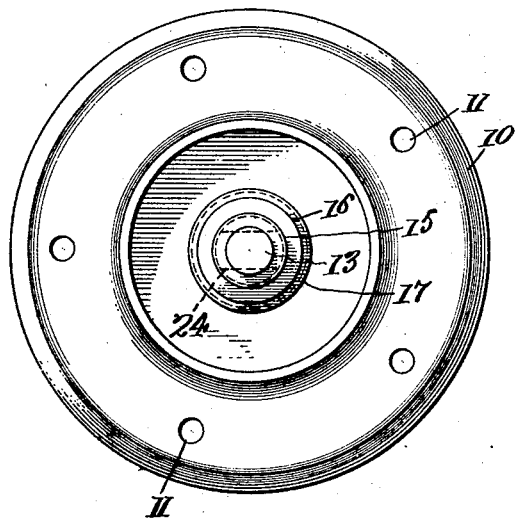
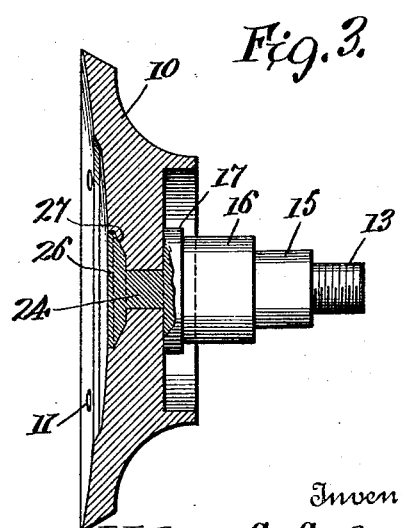
Inventor
Walter S. Cothran
by Wilkinson & Giusta
Attorneys.

Patented May 11, 1926.

1,584,616

UNITED STATES PATENT OFFICE.

WALTER SULLIVAN COTHRAN, OF ROME, GEORGIA, ASSIGNOR TO TOWERS & SULLIVAN MANUFACTURING CO., OF ROME, GEORGIA, A CORPORATION OF GEORGIA.

DISK BEARING.

Application filed December 11, 1923. Serial No. 680,010.

The present invention relates to disk bearings for use with rotary disks of the concave type which are used in plows, cultivators and other machines employing rotary disks.

An object of the invention is to provide a bearing of this type which may be made accurate and which will prevent undue wear and vibration, and a bearing which does not require constant attention as to lubrication and adjustment.

Heretofore, disk bearings have been made of cast iron which is not accurate and which usually results in "play" or other variation in the turning of the disk. Further, the friction of one piece of cast iron against another piece of the same material causes comparatively rapid wear even though it is frequently lubricated.

It is another object of the invention to overcome all of the above difficulties and to provide a disk bearing which may be accurately formed and the bearing surfaces of which may be of steel or other suitable substance to insure a comparatively perfect formation and one which will not wear out readily.

A further object of the invention is to provide a disk bearing of this type which may be practically frictionless so as to contain timken or other suitable roller bearings, which is accurate in dimension and removes all play in the operation of the disk, and which provides a shaft against which the bearings may operate. The invention also provides a bearing in which the required roller bearings may be used within the limited space available which is between the disk and the plane of the furrow wall of the land when plowing, and which at the same time is of sufficient strength to carry the roller bearings and support the disk against the relatively great pressure which is brought to bear on it, and to provide a construction wherein the bearings may be relatively small so as to curtail the cost of manufacture and operation of the disk bearing.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a vertical section taken through a disk bearing constructed according to the present invention and showing the disk secured thereto and the bearing mounted in a suitable support.

Figure 2 is an enlarged transverse section taken through the bearing support on the line 2—2 of Figure 1.

Figure 3 is a longitudinal section taken through the disk bearing on the line 3—3 of Figure 2, and Figure 4 is an inner end elevation of the same.

Referring to the drawing the disk bearing comprises an attaching plate or flange 10 provided with a suitable number of apertures 11 through which rivets, bolts or the like may be secured for attaching a disk 12 against the outer side of the plate or flange 10. The plate or flange 10 is of concave construction on its outer side to conform substantially to the convex configuration of the disk 12.

In order to provide for the necessary relatively hard bearing surface to the shaft or spindle of the bearing, and to also provide a construction which is accurate in dimensions and in configuration, the present invention provides a steel shaft 13 which at its inner end is threaded for the reception of a retaining nut 14 or the like and which is provided with successively stepped portions 15, 16 and 17 arranged to fit in a housing or support 18 which may be formed upon or attached to the lower end of a foot or standard 19 of a plow or the like.

The support 18 has a cavity 20 at its inner side into which race ways 21 are fitted and which carry suitable bearings 22 arranged for contact with the stepped portions 15 and 16 of the shaft 13. The nut 14 carries a retaining washer 23 and holds it against the outer race way 21 for maintaining it in the recess 20 and also for holding the shaft 13 against withdrawal through the outer side of the casing 18. The stepped portion 17 provides a flange or head which is seated in the outer end of the casing 18 for determining the position of the shaft 13 and to prevent the attaching plate or flange 10 from binding against the outer side of the casing 18.

Beyond the head 17 the steel shaft 13 is provided with a connecting and anchoring portion 24 in the form of a projection about which the attaching plate or flange 10 is adapted to be cast. This attaching portion 24 may be formed in any suitable manner for interlocking engagement with the cast plate 10 so that during the casting the flowing metal of the plate may flow about all of the angular portions of the part 24 and thus firmly interlock the parts together when the casting is set.

In the present instance this portion 24 is provided with opposed flat faces 25 which may be of any suitable configuration and which provides a non-circular contact face between the steel shaft and the cast plate 10. This attaching plate 10 is preferably of gray iron and the outer end of the shaft 13, beyond the attaching portion 24, is provided with a head 26 adapted to be upset or swaged into a cavity 27 formed in the concave face of the plate concentric to the axis of the same.

In order to take up the relatively small space between the steel shaft and the cast attaching plate 10, and thus prevent looseness or "play" between the parts, the combined attaching and anchoring portion 24 is peened or expanded against the inner marginal edge of the cast plate by the operation of swaging or up-setting the head 26. The steel shaft 13 and the cast plate 10 are therefore intimately associated without any play between them and the structure is practically homogeneous.

The shaft 13 may of course be given any suitable exterior configuration and may be of any suitable length so as to accommodate the shaft to bearings and housings of different sizes and construction, and so as to support the disk 12 firmly and to prevent vibration and undue wear on the parts of the bearing and to admit of the relatively easy and free-turning of the disk.

The invention is adapted to take the place of such structures as might be made of a drop forging or steel casting where the expenses of such constructions are prohibitive from a manufacturing standpoint, and the present invention obtains all of the advantageous results of such constructions and at the same time effects economies in the production which makes the device of a practical nature.

It is obvious that various changes and modifications may be made in the details of construction and design of the above specifically described embodiment of this invention without departing from the spirit thereof, such changes and modifications being restricted only by the scope of the following claims.

What is claimed is:—

1. A disk bearing comprising a steel shaft having stepped bearing portions for engagement in a support and having an outer stepped portion to limit the inward movement of the steel shaft, said steel shaft having outwardly of said outer stepped portion a non-circular shank portion and an enlarged head at the outer end of the shank, a cast iron disk attaching plate cast about said shank and head, said outer stepped portion adapted to space the cast plate from the support and said shank and head rigidly holding the cast plate from turning on the shaft.

2. A disk bearing comprising a steel shaft, a cast iron disk attaching plate therefor, said shaft having bearing portions consecutively stepped from end to end with the largest bearing portion at the outer end of the shaft and a reduced non-circular shank extending from said outer end terminating in an enlarged head, said disk attaching plate being cast about said non-circular shank between the head and the largest stepped portion of the shaft to rigidly hold the plate against rotation and longitudinal movement on the shaft, the inner stepped end of the shaft adapted to fit in a support and said largest stepped portion adapted to engage the support and hold the plate from contact therewith, and means on the inner end of the shaft connected to the support for holding the shaft from pulling outwardly.

WALTER SULLIVAN COTHRAN